US006269365B1

(12) United States Patent
Kiyoki et al.

(10) Patent No.: US 6,269,365 B1
(45) Date of Patent: *Jul. 31, 2001

(54) INTEGRATED DATABASE SYSTEM

(75) Inventors: Yasushi Kiyoki, Tsuchiura; Takashi Kitagawa, Tsukuba, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,274

(22) Filed: Jul. 31, 1997

(30) Foreign Application Priority Data

Aug. 1, 1996 (JP) .................................... 8-203471

(51) Int. Cl.[7] .................................................. G06F 17/00
(52) U.S. Cl. ........................................... 707/6; 707/3
(58) Field of Search ................................. 707/6, 8, 2, 9, 707/10; 706/45–48, 55

(56) References Cited

U.S. PATENT DOCUMENTS

| | | | |
|---|---|---|---|
| 5,325,465 | 6/1994 | Hung et al. ............................. | 395/63 |
| 5,442,791 | * 8/1995 | Wrabetz et al. ...................... | 395/650 |
| 5,475,836 | 12/1995 | Harris et al. .......................... | 395/600 |
| 5,537,590 | * 7/1996 | Amado .................................. | 395/600 |
| 5,584,026 | * 12/1996 | Knudsen et al. ...................... | 595/601 |
| 5,590,321 | * 12/1996 | Lin et al. ............................... | 707/10 |
| 5,596,744 | * 1/1997 | Dao et al. .............................. | 707/10 |
| 5,754,845 | * 5/1998 | White ..................................... | 707/10 |
| 5,884,306 | * 3/1999 | Bliss et al. ............................. | 707/7 |

OTHER PUBLICATIONS

Huang J–W: "Multibase: A Heterogenous Multidatabase Management System" Proceedings of the Annual International Computer Software and Applications Conference (COMPSAC), Taipei, Nov. 9–11, 1994, No. Conf. 18, Nov. 9, 1994, pp. 332–339, XP000531333 Institute of Electrical and Electronics Engineers.

Owrang M et al: "Translation of Queries to Account for Different DBMSS" Proceedings of the National Computer Conference, Chicago, Jun. 15–18, 1987, No. vol. 56, Jun. 15, 1987, pp 637, 639–643, XP000011451 American Federation of Information Processing Societies, pp 641, col. 1, line 1—p. 643, col. 1, line 33.

* cited by examiner

*Primary Examiner*—Kim Vu
*Assistant Examiner*—Alford W. Kindred
(74) *Attorney, Agent, or Firm*—Fitzpatrick, Cella, Harper & Scinto

(57) ABSTRACT

An integrated database system for performing data processing utilizing plural types of databases. A Meta level system 15 includes a script interpreter 8 which interprets an inquiry represented by a script form which has been addressed to a database to issue a primitive corresponding to the inquiry and combines replies represented by a primitive form received from plural types of databases 11. A local database system 14 includes a primitive processor 9 which transforms the primitive into a control command corresponding to the type of the database 11, outputs the transformed command to the plural types of databases 11, and replies to the Meta level system 15 with the process result represented by the primitive form.

15 Claims, 19 Drawing Sheets

FIG. 7

CONTENTS OF INQUIRY

| ITEM | ITEM OF INQUIRY | CONDITION |
|---|---|---|
| 1: | HOTEL : NAME OF HOTEL | LOCATION IS IN CHIYODA-KU |
| 2: | HOTEL : RATE | SINGLE ROOM IS ¥10.000 -19.000 |
| 3: | TRAIN BOUND FOR NARITA AIRPORT : NAME OF TRAIN | TRAIN SATISFYING CONDITION OF ITEMS 6 AND 7 |
| 4: | TRAIN BOUND FOR NARITA AIRPORT : DEPARTURE TIME AT TOKYO STATION | TRAIN SATISFYING CONDITION OF ITEMS 6 AND 7 |
| 5: | TRAIN BOUND FOR NARITA AIRPORT : ARRIVAL TIME AT NATIRA AIRPORT STATION | TRAIN SATISFYING CONDITION OF ITEMS 6 AND 7 |
| 6: | AIRPLANE BOUND FOR NEWYORK : FLIGHT NUMBER | DEPART NARITA BETWEEN 10 : 00 - 18 : 00 ON SUNDAY |
| 7: | AIRPLANE BOUND FOR NEWYORK : DEPARTURE TIME AT NARITA AIRPORT | TIME NECESSARY FOR TRANSFER AT NARITA AIRPORT 0 : 40 - 2 : 00 |

FIG. 8

EXAMPLE OF SCRIPT TRANSFORMATION

```
010 : SSTART :
      /******************************
      OBTAIN DATABASE hotel FROM / DB / Hotel.euc
      ******************************/
020 : m-open # / DB / Hotel.Euc # hotel ;
      /*
      RETRIEVE LINE THAT SATISFIES CONDITION : LOCATION IS IN CHIYODA-KU, AND RATE
      FOR SINGLE ROOM IS ¥10,000-19,000, FROM DATABASE hotel
      */
030 : m-select # hotel, LOCATING DISTRICT (string), = =, "CHIYODA-KU" # hotel ;
040 : m-select # hotel, SINGLE RATE (int), > =, 10000 # hotel ;
050 : m-select # hotel, SINGLE RATE (int), < =, 19000 # hotel ;
      /******************************
      OBTAIN DATABASE nex FROM / DB / Jr_nex.euc
      ******************************/
060 : m-open # / DB / NEX_DB.euc # nex ;
      / * COMBINE TABLE hotel AND TABLE nex * /
070 : m-join # hotel, nex, check_out (time), Tokyo (time), 1 = #rv ;
      /******************************
      OBTAIN DATABASE air FROM / DB / airline.euc
      ******************************/
080 : m-open # / DB / Airline.euc # air
      / * RETRIEVE LINE THAT SATISFIES CONDITION : LEAVE ON SUNDAY, BOUND FOR
      NEWYORK, AND DEPART NARITA BETWEEN 10 : 00 - 18 : 00, FROM DATABASE air * /
090 : m-select # air, p_wkday (int), = =, 7 # air ;
100 : m-select # air, Destination (string), = =, " NewYork' # air ;
110 : m-select # air, NaritaDept (time), >, 10 : 00 # air ;
120 : m-select # air, NaritaDept (time), <, 18 : 00 # air ;
      /*
      COMBINE DATA WHICH SATISFIES CONDITION : TIME DIFFERENCE BETWEEN ARRIVAL
      TIME OF NARITA EXPRESS TRAIN AT NARITA AIRPORT STATION AND DEPARTURE TIME
      OF AIRPLANE THAT SATISFIES DEPARTURE CONDITION IS MORE THAN 40 MINUTES
      AND LESS THAN 2 HOURS, AND OUTPUT THE RESULT TO INTERNAL TABLE rv
      */
130 : m-temporal_join1 # nex, air, NARITA AIRPORT
      ARRIVAL(time), NaritaDept(time), 00 : 40, 02 : 00 # rv ;
      / * PROJECT HOTEL NAME(string), SINGLE ROOM RATE(int), NAME OF TRAIN(string),
      TOKYO DEPARTURE (time), NARITA AIRPORT ARRIVAL (time), Flight / Code
      (string), NaritaDept (time) IN INTERNAL TABLE rv * /
140 : m-projection # rv, HOTEL NAME(string), SINGLE ROOM RATE(int), NAME OF TRAIN(string),
TOKYO DEPARTURE(time), NARITA AIRPORT ARRIVAL (time),
      Flight / Code(string), NaritaDept(time)
      / * OUTPUT TO INTERNAL TABLE rv * /
150 : m-print # rv # :
160 : SEND.
```

FIG. 9A

SYNTAX OF SCRIPT

| TYPE OF OPERATION | CONTENTS | NUMBER OF ARGUMENT | #ARGUMENT-1,#ARGUMENT-2,..., ARGUMENT-N# | OUTPUT OBJECT | END OF FILE |
|---|---|---|---|---|---|
| SSTART | START SCRIPT FILE | 0 | | | ; |
| SEND | END SCRIPT FILE | 0 | | | ; |
| m-open | OPEN DATABASE SERVICE | 1 | DATABASE NAME | TABLE NAME | ; |
| m-close | CLOSE DATABASE SERVICE | | | | ; |
| m-select | RETRIEVE DATA WHICH SATISFIES CONDITION FROM TABLE SUBJECTED TO RETRIEVING | 4 | 1) TABLE NAME SUBJECTED TO RETRIEVING<br>2) ATTRIBUTE NAME<br>3) CONDITION CALCULATION OPERATION<br>4) CONDITION COMPARISON VALUE | TABLE NAME WHERE RETRIEVED RESULT IS STORED | ; |
| m-join | COMBINE TWO TABLES BASED ON DESIGNATED CONDITION | 5 | 1) COMBINE OBJECT TABLE NAME-1<br>2) COMBINE OBJECT TABLE NAME-2<br>3) COMBINE OBJECT ATTRIBUTE-1 IN COMBINE OBJECT TABLE NAME-1<br>4) COMBINE OBJECT ATTRIBUTE-2 IN COMBINE OBJECT TABLE NAME-2<br>5) CONDITION COMPARISON VALUE | TABLE NAME WHERE RETRIEVED RESULT IS STORED | ; |

FIG. 9B

| | | | |
|---|---|---|---|
| m-temporal_join1 | COMBINE TWO TABLES BY DETERMINING RESULT OF CALCULATING TIME DIFFERENCE OF ATTRIBUTE VALUES | 6 | 1) COMBINE OBJECT TABLE NAME-1<br>2) COMBINE OBJECT TABLE NAME-2<br>3) COMBINE OBJECT ATTRIBUTE-1 IN COMBINE OBJECT TABLE NAME-1<br>4) COMBINE OBJECT ATTRIBUTE-2 IN COMBINE OBJECT TABLE NAME-2<br>5) LOWER LIMIT FOR DIFFERENCE IN ATTRIBUTES SUBJECTED TO COMBINING<br>6) UPPER LIMIT FOR DIFFERENCE IN ATTRIBUTES SUBJECTED TO COMBINING | TABLE NAME WHERE RETRIEVED RESULT IS STORED |
| m-projection | PROJECT DESIGNATED ATTRIBUTE ON PROJECTION OBJECT | 1 OR MORE | 1) OBJECT TABLE NAME<br>2) PROJECTION OBJECT ATTRIBUTE-1<br>3) PROJECTION OBJECT ATTRIBUTE-2<br>4) PROJECTION OBJECT ATTRIBUTE-3 | TABLE NAME WHERE PROJECTION RESULT IS STORED |
| m-print | DISPLAY AND OUTPUT TABLE | | TABLE NAME | |

FIG. 10

PRIMITIVE ISSUANCE PROCESSING BY func_sstart ( )

PRIMITIVE CORRESPONDING TO SSTART ;

---
mmdb_sta = mmdb_open ( )
---

PRIMITIVE ISSUANCE PROCESSING BY func_open ( )

PRIMITIVE CORRESPONDING TO m-open # 「DATABASE NAME」 # 「TABLE NAME」 ;

---
mmdb_sta = mmdb_service ( 「DATABASE NAME」 , 「TABLE NAME」 ,&ℓdbinf) ;
memsta = gen_memalloc (ℓdbinf.mem_size) ;
ℓdbsta = ℓdb_open ( & ℓdbinf ) ;
---

PRIMITIVE ISSUANCE PROCESSING BY func_select ( )

PRIMITIVE CORRESPONDING TO m-select # 「TABLE NAME SUBJECTED TO RETRIEVING」 「ATTRIBUTE NAME」 「CONDITION CALCULATION OPERATION」 # 「CONDITION COMPARISON VALUE」 # 「OUTPUT TABLE NAME」 ;

---
ℓdbsta =ℓdb_select (&ℓdbinf, & memsta, 「TABLE NAME SUBJECTED TO RETRIEVING」 「ATTRIBUTE NAME」 「CONDITION CALCULATION OPERATION」 「CONDITION COMPARISON VALUE」 ) ;
---

PRIMITIVE ISSUANCE PROCESSING BY func_temp_join1 ( )

PRIMITIVE CORRESPONDING TO m-temporal_join1 # 「COMBINE OBJECT TABLE NAME-1」 「COMBINE OBJECT TABLE NAME-2」 「COMBINE OBJECT ATTRIBUTE-1 IN COMBINE OBJECT TABLE NAME-1」 「COMBINE OBJECT ATTRIBUTE-2 IN COMBINE OBJECT TABLE NAME-2」 「LOWER LIMIT FOR DIFFERENCE IN ATTRIBUTES SUBJECTED TO COMBINING」 「UPPER LIMIT FOR DIFFERENCE IN ATTRIBUTES SUBJECTED TO COMBINING」 # 「OUTPUT TABLE NAME」 ;

---
mdbinf = mm_temporal_join1 ( 「COMBINE OBJECT TABLE NAME-1」 「COMBINE OBJECT TABLE NAME-2」 「COMBINE OBJECT ATTRIBUTE-1 IN COMBINE OBJECT TABLE NAME-1」 「COMBINE OBJECT ATTRIBUTE-2 IN COMBINE OBJECT TABLE NAME-2」 「LOWER LIMIT FOR DIFFERENCE IN ATTRIBUTES SUBJECTED TO COMBINING」 「UPPER LIMIT FOR DIFFERENCE IN ATTRIBUTES SUBJECTED TO COMBINING」 )
---

FIG. 11

TABLE hotel

| HOTEL id (string) | HOTEL NAME (string) | DISTRICT (string) | CITY (string) | CHECK-IN (time) | CHECK-OUT (time) | RATE FOR SINGLE ROOM (int) | RATE FOR TWIN ROOM (int) |
|---|---|---|---|---|---|---|---|
| 0 | OKUNI HOTEL | CHIYODA-KU | UCHISAIWAICHO 19 CHOME | 14:00 | 12:00 | 17000 | 65000 |
| 1 | KING HOTEL | MINATO-KU | SHIBAKOEN 18 CHOME | 13:30 | 11:00 | 19000 | 57000 |
| 2 | NEW OHTAKA | CHIYODA-KU | KIOICHO 19 CHOME | 14:00 | 12:00 | 24500 | 72800 |
| 3 | SEIKYU HOTEL | CHIYODA-KU | NAGATACHO 12 CHOME | 15:00 | 10:30 | 7000 | 30000 |
| 4 | HOTEL FRIEND | CHUO-KU | GINZA 14 CHOME | 18:00 | 10:00 | 5500 | null |
| 5 | HOTEL A&B | CHIYODA-KU | YAESU 11 CHOME | 16:00 | 09:30 | 6300 | null |
| 6 | OPAL HOTEL | MINATO-KU | NISHISHINBASHI 10 CHOME | 17:00 | 10:00 | 10000 | null |
| 7 | AKASAKA KING | CHIYODA-KU | KIOICHO 13 CHOME | 12:00 | 12:00 | 35000 | 32000 |
| 8 | GOHONGI HOTEL | MINATO-KU | ROPPONGI 19 CHOME | 13:00 | 12:00 | 12000 | 23000 |
| 9 | SHINAGAWA KING | SHINAGAWA-KU | AOMONOYOKOCHO 1 CHOME | 13:00 | 11:00 | 9400 | 14100 |

FIG. 12

TABLE hotel AFTER COMPLETING SCRIPT LINE 050

| HOTEL id (string) | HOTEL NAME (string) | DISTRICT (string) | CITY (string) | CHECK-IN (time) | CHECK-OUT (time) | RATE FOR SINGLE ROOM (int) | RATE FOR TWIN ROOM (int) |
|---|---|---|---|---|---|---|---|
| 0 | OKUNI HOTEL | CHIYODA-KU | UCHISAIWAICHO 19 CHOME | 14:00 | 12:00 | 17000 | 65000 |
| 8 | GOHONGI HOTEL | MINATO-KU | ROPPONGI 19 CHOME | 13:00 | 12:00 | 12000 | 23000 |

FIG. 13

TABLE gis

| AREA ID (string) | FROM LOCATION (string) | TO TOKYO (time) | TO YURAKUCHO (time) | TO SHINBASHI (time) | TO HAMAMATSUCHO (time) |
|---|---|---|---|---|---|
| 0 | TOKYO-TO CHIYODA-KU IIDABASHI 1 | hh : mm | hh : mm | hh : mm | hh : mm |
| 1 | TOKYO-TO CHIYODA-KU IIDABASHI 2 | hh : mm | hh : mm | hh : mm | hh : mm |
| 2 | TOKYO-TO CHIYODA-KU IIDABASHI 3 | hh : mm | hh : mm | hh : mm | hh : mm |
| 3 | TOKYO-TO CHIYODA-KU IIDABASHI 4 | hh : mm | hh : mm | hh : mm | hh : mm |
| 4 | TOKYO-TO CHIYODA-KU ICHIBANMACHI | hh : mm | hh : mm | hh : mm | hh : mm |
| 5 | TOKYO-TO CHIYODA-KU IWAMOTOCHO 1 | hh : mm | hh : mm | hh : mm | hh : mm |
| 6 | TOKYO-TO CHIYODA-KU IWAMOTOCHO 2 | hh : mm | hh : mm | hh : mm | hh : mm |
| 7 | TOKYO-TO CHIYODA-KU IWAMOTOCHO 3 | hh : mm | hh : mm | hh : mm | hh : mm |
| 8 | TOKYO-TO CHIYODA-KU UCHIKANDA 1 | hh : mm | hh : mm | hh : mm | hh : mm |
| 9 | TOKYO-TO CHIYODA-KU UCHIKANDA 2 | hh : mm | hh : mm | hh : mm | hh : mm |
| 10 | TOKYO-TO CHIYODA-KU UCHIKANDA 3 | hh : mm | hh : mm | hh : mm | hh : mm |
| 11 | TOKYO-TO CHIYODA-KU UCHISAIWAICHO 1 | hh : mm | hh : mm | hh : mm | hh : mm |
| 12 | TOKYO-TO CHIYODA-KU UCHISAIWAICHO 2 | hh : mm | hh : mm | hh : mm | hh : mm |
| 13 | TOKYO-TO CHIYODA-KU OTEMACHI 1 | hh : mm | hh : mm | hh : mm | hh : mm |
| 14 | TOKYO-TO CHIYODA-KU OTEMACHI 2 | hh : mm | hh : mm | hh : mm | hh : mm |

FIG. 14

TABLE nex

| EXP_ID (int) | TRAIN NUMBER (string) | TRAIN NAME (string) | DEPARTURE AT YOKOHAMA (time) | DEPARTURE AT SHINJUKU (time) | ARRIVAL AT TOKYO (time) | DEPARTURE AT TOKYO (time) | ARRIVAL AT NARITA AIRPORT (time) |
|---|---|---|---|---|---|---|---|
| 0 | 2001M | NARITA EXPRESS 1 | null | 06:07 | 06:27 | 06:30 | 07:29 |
| 1 | 2003M | NARITA EXPRESS 3 | 06:25 | 06:33 | 06:57 | 07:00 | 07:59 |
| 2 | 2005M | NARITA EXPRESS 5 | null | 07:07 | 07:27 | 07:30 | 08:31 |
| 3 | 2007M | NARITA EXPRESS 7 | 07:26 | null | 07:57 | 08:00 | 08:58 |
| 4 | 2009M | NARITA EXPRESS 9 | null | 08:07 | 08:27 | 08:30 | 09:27 |
| 5 | 2011M | NARITA EXPRESS 11 | 08:26 | null | 08:57 | 09:00 | 09:59 |
| 6 | 2013M | NARITA EXPRESS 13 | 09:30 | 09:40 | 10:00 | 10:03 | 10:59 |
| 7 | 2015M | NARITA EXPRESS 15 | 10:30 | 10:42 | 11:00 | 11:03 | 11:59 |
| 8 | 2017M | NARITA EXPRESS 17 | 11:30 | 11:42 | 12:00 | 12:03 | 12:59 |
| 9 | 2019M | NARITA EXPRESS 19 | 12:30 | 12:42 | 13:00 | 13:03 | 13:57 |
| 10 | 2021M | NARITA EXPRESS 21 | 13:00 | 13:12 | 13:30 | 13:33 | 14:27 |
| 11 | 2023M | NARITA EXPRESS 23 | 13:30 | 13:42 | 14:00 | 14:03 | 14:56 |
| 12 | 2025M | NARITA EXPRESS 25 | 14:00 | 14:12 | 14:30 | 14:33 | 15:27 |
| 13 | 2027M | NARITA EXPRESS 27 | 14:30 | 14:42 | 15:00 | 15:03 | 15:58 |
| 14 | 2029M | NARITA EXPRESS 29 | 15:00 | 15:12 | 15:30 | 15:33 | 16:28 |
| 15 | 2031M | NARITA EXPRESS 31 | 15:30 | 15:42 | 16:00 | 16:03 | 16:57 |
| 16 | 2033M | NARITA EXPRESS 33 | null | 16:12 | 16:30 | 16:33 | 17:28 |
| 17 | 2035M | NARITA EXPRESS 35 | 16:31 | null | 17:00 | 17:03 | 17:56 |
| 18 | 2037M | NARITA EXPRESS 37 | null | 17:12 | 17:30 | 17:33 | 18:27 |
| 19 | 2039M | NARITA EXPRESS 39 | 17:32 | null | 18:00 | 18:03 | 18:57 |
| 20 | 2041M | NARITA EXPRESS 41 | null | 18:11 | 18:30 | 18:33 | 19:33 |
| 21 | 2043M | NARITA EXPRESS 43 | 18:32 | null | 19:00 | 19:03 | 20:03 |
| 22 | 2045M | NARITA EXPRESS 45 | 19:30 | 19:42 | 20:00 | 20:03 | 21:13 |

FIG. 15

TABLE air

| Plane_ID (int) | Flight_Code (string) | p_wkday (int) | FLIGHT DAY (string) | NaritaDept (time) | Destination (string) | Airport (string) | Arrival (time) | Required (time) |
|---|---|---|---|---|---|---|---|---|
| 0 | JL_20 | 1 | MON | 12:00 | Atlanta | ATL | 10:00 | 12:00 |
| 1 | JL_20 | 3 | WED | 12:00 | Atlanta | ATL | 10:00 | 12:00 |
| 2 | JL_20 | 5 | FRI | 12:00 | Atlanta | ATL | 10:00 | 12:00 |
| 3 | DL_52 | 1 | MON | 18:55 | Atlanta | ATL | 19:45 | 14:50 |
| 4 | DL_52 | 2 | TUE | 18:55 | Atlanta | ATL | 19:45 | 14:50 |
| 5 | DL_52 | 3 | WED | 18:55 | Atlanta | ATL | 19:45 | 14:50 |
| 6 | DL_52 | 4 | THU | 18:55 | Atlanta | ATL | 19:45 | 14:50 |
| 7 | DL_52 | 5 | FRI | 18:55 | Atlanta | ATL | 19:45 | 14:50 |
| 8 | DL_52 | 6 | SAT | 18:55 | Atlanta | ATL | 19:45 | 14:50 |
| 9 | DL_52 | 7 | SUN | 18:55 | Atlanta | ATL | 19:45 | 14:50 |
| 10 | NH_10 | 1 | MON | 11:00 | NewYork | JFK | 09:15 | 12:15 |
| 11 | HN_10 | 2 | TUE | 11:00 | NewYork | JFK | 09:15 | 12:15 |
| 12 | HN_10 | 3 | WED | 11:00 | NewYork | JFK | 09:15 | 12:15 |
| 13 | HN_10 | 4 | THU | 11:00 | NewYork | JFK | 09:15 | 12:15 |
| 14 | HN_10 | 5 | FRI | 11:00 | NewYork | JFK | 09:15 | 12:15 |
| 15 | HN_10 | 6 | SAT | 11:00 | NewYork | JFK | 09:15 | 12:15 |
| 16 | HN_10 | 7 | SUN | 11:00 | NewYork | JFK | 09:15 | 12:15 |
| 17 | JL_6 | 1 | MON | 12:00 | NewYork | JFK | 10:15 | 12:15 |
| 18 | JL_6 | 2 | TUE | 12:00 | NewYork | JFK | 10:15 | 12:15 |
| 19 | JL_6 | 3 | WED | 12:00 | NewYork | JFK | 10:15 | 12:15 |
| 20 | JL_6 | 4 | THU | 12:00 | NewYork | JFK | 10:15 | 12:15 |
| 21 | JL_6 | 5 | FRI | 12:00 | NewYork | JFK | 10:15 | 12:15 |
| 22 | JL_6 | 6 | SAT | 12:00 | NewYork | JFK | 10:15 | 12:15 |
| 23 | JL_6 | 7 | SUN | 12:00 | NewYork | JFK | 10:15 | 12:15 |
| 24 | NW_18 | 1 | MON | 15:30 | NewYork | JFK | 13:50 | 12:20 |
| 25 | NW_18 | 2 | TUE | 15:30 | NewYork | JFK | 13:50 | 12:20 |
| 26 | NW_18 | 3 | WED | 15:30 | NewYork | JFK | 13:50 | 12:20 |
| 27 | NW_18 | 4 | THU | 15:30 | NewYork | JFK | 13:50 | 12:20 |
| 28 | NW_18 | 5 | FRI | 15:30 | NewYork | JFK | 13:50 | 12:20 |
| 29 | NW_18 | 6 | SAT | 15:30 | NewYork | JFK | 13:50 | 12:20 |
| 30 | NW_18 | 7 | SUN | 15:30 | NewYork | JFK | 13:50 | 12:20 |
| 31 | UA_800 | 1 | MON | 18:20 | NewYork | JFK | 16:45 | 12:25 |
| 32 | UA_800 | 2 | TUE | 18:20 | NewYork | JFK | 16:45 | 12:25 |
| 33 | UA_800 | 3 | WED | 18:20 | NewYork | JFK | 16:45 | 12:25 |
| 34 | UA_800 | 4 | THU | 18:20 | NewYork | JFK | 16:45 | 12:25 |
| 35 | UA_800 | 5 | FRI | 18:20 | NewYork | JFK | 16:45 | 12:25 |
| 36 | UA_800 | 6 | SAT | 18:20 | NewYork | JFK | 16:45 | 12:25 |
| 37 | UA_800 | 7 | SUN | 18:20 | NewYork | JFK | 16:45 | 12:25 |

FIG. 16

TABLE air (CONTINUED)

| | | | | | | | | |
|---|---|---|---|---|---|---|---|---|
| 38 | UA_852 | 1 | MON | 17:00 | NewYork | EWR | 19:16 | 16:16 |
| 39 | UA_852 | 2 | TUE | 17:00 | NewYork | EWR | 19:16 | 16:16 |
| 40 | UA_852 | 3 | WED | 17:00 | NewYork | EWR | 19:16 | 16:16 |
| 41 | UA_852 | 4 | THU | 17:00 | NewYork | EWR | 19:16 | 16:16 |
| 42 | UA_852 | 5 | FRI | 17:00 | NewYork | EWR | 19:16 | 16:16 |
| 43 | UA_852 | 6 | SAT | 17:00 | NewYork | EWR | 19:16 | 16:16 |
| 44 | UA_852 | 7 | SUN | 17:00 | NewYork | EWR | 19:16 | 16:16 |
| 45 | UA_802 | 1 | MON | 18:10 | NewYork | EWR | 16:25 | 12:15 |
| 46 | UA_802 | 2 | TUE | 18:10 | NewYork | EWR | 16:25 | 12:15 |
| 47 | UA_802 | 3 | WED | 18:10 | NewYork | EWR | 16:25 | 12:15 |
| 48 | UA_802 | 4 | THU | 18:10 | NewYork | EWR | 16:25 | 12:15 |
| 49 | UA_802 | 5 | FRI | 18:10 | NewYork | EWR | 16:25 | 12:15 |
| 50 | UA_802 | 6 | SAT | 18:10 | NewYork | EWR | 16:25 | 12:15 |
| 51 | UA_802 | 7 | SUN | 18:10 | NewYork | EWR | 16:25 | 12:15 |
| 52 | AA_2728 | 1 | MON | 19:05 | NewYork | LGA | 21:35 | 16:30 |
| 53 | AA_2728 | 2 | TUE | 19:05 | NewYork | LGA | 21:35 | 16:30 |
| 54 | AA_2728 | 3 | WED | 19:05 | NewYork | LGA | 21:35 | 16:30 |
| 55 | AA_2728 | 4 | THU | 19:05 | NewYork | LGA | 21:35 | 16:30 |
| 56 | AA_2728 | 5 | FRI | 19:05 | NewYork | LGA | 21:35 | 16:30 |
| 57 | AA_2728 | 6 | SAT | 19:05 | NewYork | LGA | 21:35 | 16:30 |
| 58 | AA_2728 | 7 | SUN | 19:05 | NewYork | LGA | 21:35 | 16:30 |
| 59 | KE_2 | 1 | MON | 14:55 | LosAngels | LAX | 07:30 | 09:35 |
| 60 | KE_2 | 2 | TUE | 14:55 | LosAngels | LAX | 07:30 | 09:35 |
| 61 | KE_2 | 3 | WED | 14:55 | LosAngels | LAX | 07:30 | 09:35 |
| 62 | KE_2 | 4 | THU | 14:55 | LosAngels | LAX | 07:30 | 09:35 |
| 63 | KE_2 | 5 | FRI | 14:55 | LosAngels | LAX | 07:30 | 09:35 |
| 64 | KE_2 | 6 | SAT | 14:55 | LosAngels | LAX | 07:30 | 09:35 |
| 65 | KE_2 | 7 | SUN | 14:55 | LosAngels | LAX | 07:30 | 09:35 |
| 66 | NW_2 | 1 | MON | 15:35 | LosAngels | LAX | 08:20 | 09:45 |
| 67 | NW_2 | 2 | TUE | 15:35 | LosAngels | LAX | 08:20 | 09:45 |
| 68 | NW_2 | 3 | WED | 15:35 | LosAngels | LAX | 08:20 | 09:45 |
| 69 | NW_2 | 4 | THU | 15:35 | LosAngels | LAX | 08:20 | 09:45 |
| 70 | NW_2 | 5 | FRI | 15:35 | LosAngels | LAX | 08:20 | 09:45 |
| 71 | NW_2 | 6 | SAT | 15:35 | LosAngels | LAX | 08:20 | 09:45 |
| 72 | NW_2 | 7 | SUN | 15:35 | LosAngels | LAXJ | 08:20 | 09:45 |
| 73 | UA_890 | 1 | MON | 16:30 | LosAngels | LAX | 09:10 | 09:40 |
| 74 | UA_890 | 2 | TUE | 16:30 | LosAngels | LAX | 09:10 | 09:40 |
| 75 | UA_890 | 3 | WED | 16:30 | LosAngels | LAX | 09:10 | 09:40 |
| 76 | UA_890 | 4 | THU | 16:30 | LosAngels | LAX | 09:10 | 09:40 |

FIG. 17

TABLE air (CONTINUED)

| 77 | UA_890 | 5 | FRI | 16:30 | LosAngels | LAX | 19:10 | 19:40 |
|---|---|---|---|---|---|---|---|---|
| 78 | UA_890 | 6 | SAT | 16:30 | LosAngels | LAX | 19:10 | 19:40 |
| 79 | UA_890 | 7 | SUN | 16:30 | LosAngels | LAX | 19:10 | 19:40 |
| 80 | JL_62 | 1 | MON | 17:20 | LosAngels | LAX | 19:55 | 19:35 |
| 81 | JL_62 | 2 | TUE | 17:20 | LosAngels | LAX | 19:55 | 19:35 |
| 82 | JL_62 | 3 | WED | 17:20 | LosAngels | LAX | 19:55 | 19:35 |
| 83 | JL_62 | 4 | THU | 17:20 | LosAngels | LAX | 19:55 | 19:35 |
| 84 | JL_62 | 5 | FRI | 17:20 | LosAngels | LAX | 19:55 | 19:35 |
| 85 | JL_62 | 6 | SAT | 17:20 | LosAngels | LAX | 19:55 | 19:35 |
| 86 | JL_62 | 7 | SUN | 17:20 | LosAngels | LAX | 19:55 | 19:35 |
| 87 | NH_6 | 1 | MON | 18:00 | LosAngels | LAX | 10:30 | 09:30 |
| 88 | NH_6 | 2 | TUE | 18:00 | LosAngels | LAX | 10:30 | 09:30 |
| 89 | NH_6 | 3 | WED | 18:00 | LosAngels | LAX | 10:30 | 09:30 |
| 90 | NH_6 | 4 | THU | 18:00 | LosAngels | LAX | 10:30 | 09:30 |
| 91 | NH_6 | 5 | FRI | 18:00 | LosAngels | LAX | 10:30 | 09:30 |
| 92 | NH_6 | 6 | SAT | 18:00 | LosAngels | LAX | 10:30 | 09:30 |
| 93 | NH_6 | 7 | SUN | 18:00 | LosAngels | LAX | 10:30 | 09:30 |
| 94 | MH_92 | 1 | MON | 17:30 | LosAngels | LAX | 10:00 | 09:30 |
| 95 | MH_92 | 4 | THU | 17:30 | LosAngels | LAX | 10:00 | 09:30 |
| 96 | MH_92 | 6 | SAT | 17:30 | LosAngels | LAX | 10:00 | 09:30 |
| 97 | SQ_12 | 1 | MON | 18:15 | LosAngels | LAX | 10:55 | 09:40 |
| 98 | SQ_12 | 2 | TUE | 18:15 | LosAngels | LAX | 10:55 | 09:40 |
| 99 | SQ_12 | 3 | WED | 18:15 | LosAngels | LAX | 10:55 | 09:40 |
| 100 | SQ_12 | 4 | THU | 18:15 | LosAngels | LAX | 10:55 | 09:40 |
| 101 | SQ_12 | 5 | FRI | 18:15 | LosAngels | LAX | 10:55 | 09:40 |
| 102 | SQ_12 | 6 | SAT | 18:15 | LosAngels | LAX | 10:55 | 09:40 |
| 103 | SQ_12 | 7 | SUN | 18:15 | LosAngels | LAX | 10:55 | 09:40 |
| 104 | DL_78 | 1 | MON | 18:25 | LosAngels | LAX | 11:10 | 09:45 |
| 105 | DL_78 | 2 | TUE | 18:25 | LosAngels | LAX | 11:10 | 09:45 |
| 106 | DL_78 | 4 | THU | 18:25 | LosAngels | LAX | 11:10 | 09:45 |
| 107 | DL_78 | 5 | FRI | 18:25 | LosAngels | LAX | 11:10 | 09:45 |
| 108 | DL_78 | 6 | SAT | 18:25 | LosAngels | LAX | 11:10 | 09:45 |
| 109 | DL_78 | 7 | SUN | 18:25 | LosAngels | LAX | 11:10 | 09:45 |
| 110 | RG_833 | 1 | MON | 19:00 | LosAngels | LAX | 11:40 | 09:40 |
| 111 | JL_64 | 1 | MON | 22:00 | LosAngels | LAX | 14:35 | 09:35 |
| 112 | JL_64 | 4 | THU | 22:00 | LosAngels | LAX | 14:35 | 09:35 |
| 113 | UA_826 | 1 | MON | 22:20 | LosAngels | LAX | 16:51 | 13:31 |
| 114 | UA_826 | 2 | TUE | 22:20 | LosAngels | LAX | 16:51 | 13:31 |
| 115 | UA_826 | 3 | WED | 22:20 | LosAngels | LAX | 16:51 | 13:31 |
| 116 | UA_826 | 4 | THU | 22:20 | LosAngels | LAX | 16:51 | 13:31 |

CONTENTS OF TABLE air
AFTER COMPLETING
SCRIPT LINE 120

FIG. 18

| Plane_ID (int) | Flight_Code (string) | p_wkday (int) | FLIGHT DAY (string) | NaritaDept (time) | Destination (string) | Airport (string) | Arrival (time) | Required (time) |
|---|---|---|---|---|---|---|---|---|
| 16 | NH_10 | 7 | SUN | 11:00 | NewYork | JFK | 09:15 | 12:15 |
| 23 | JL_6 | 7 | SUN | 12:00 | NewYork | JFK | 10:15 | 12:15 |
| 30 | NW_18 | 7 | SUN | 15:30 | NewYork | JFK | 13:50 | 12:20 |
| 44 | UA_852 | 7 | SUN | 17:00 | NewYork | EWR | 19:16 | 16:16 |
| 51 | UA_802 | 7 | SUN | 18:10 | NewYork | EWR | 16:25 | 12:15 |
| 58 | AA_2728 | 7 | SUN | 19:05 | NewYork | LGA | 21:35 | 16:30 |

FIG. 19

OUTPUT EXAMPLE OF PRESENT SYSTEM

| HOTEL NAME (string) | PRICE FOR SINGLE ROOM (int) | TRAIN NAME (string) | DEPARTURE AT TOKYO (time) | ARRIVAL AT NARITA AIRPORT (time) | FLIGHT No. (string) | DEPARTURE AT NARITA (time) |
|---|---|---|---|---|---|---|
| OKUNI HOTEL | 17000 | NARITA EXPRESS 9 | 18:30 | 09:27 | NH_10 | 11:00 |
| OKUNI HOTEL | 17000 | NARITA EXPRESS 11 | 09:00 | 09:59 | NH_10 | 11:00 |
| OKUNI HOTEL | 17000 | NARITA EXPRESS 13 | 10:03 | 10:59 | JL_6 | 12:00 |
| OKUNI HOTEL | 17000 | NARITA EXPRESS 19 | 13:03 | 13:57 | NW_18 | 15:30 |
| OKUNI HOTEL | 17000 | NARITA EXPRESS 21 | 13:33 | 14:27 | NW_18 | 15:30 |
| OKUNI HOTEL | 17000 | NARITA EXPRESS 25 | 14:33 | 15:27 | UA_852 | 17:00 |
| OKUNI HOTEL | 17000 | NARITA EXPRESS 27 | 15:03 | 15:58 | UA_852 | 17:00 |
| AKASAKA KING | 12000 | NARITA EXPRESS 9 | 08:30 | 09:27 | NH_10 | 11:00 |
| AKASAKA KING | 12000 | NARITA EXPRESS 11 | 09:00 | 09:59 | NH_10 | 11:00 |
| AKASAKA KING | 12000 | NARITA EXPRESS 13 | 10:03 | 10:59 | JL_6 | 12:00 |
| AKASAKA KING | 12000 | NARITA EXPRESS 19 | 13:03 | 13:57 | NW_18 | 15:30 |
| AKASAKA KING | 12000 | NARITA EXPRESS 21 | 13:33 | 14:27 | NW_18 | 15:30 |
| AKASAKA KING | 12000 | NARITA EXPRESS 25 | 14:33 | 15:27 | UA_852 | 17:00 |
| AKASAKA KING | 12000 | NARITA EXPRESS 27 | 13:03 | 15:58 | UA_852 | 17:00 |

INTEGRATED DATABASE SYSTEM

BACKGROUND OF THE INVENTION

The present invention relates to an integrated database system having as a purpose to perform data processing utilizing a plurality of different databases.

A requirement to share or to commonly use databases is widely encountered within an organization, among organizations or among individuals. Further, because of the prevalence of wide-spread networks, regions sharing a group of databases are also extended. In such an environment, various attempts have already been made to realize sharing and common use of databases or practical commercialization within a limited area.

In order to enable sharing and common use of the group of databases not only within the aforementioned limited area, but also in a wider area, it is necessary to realize a multi-database system suitable for an environment where a large number of database systems are connected via a wide-spread high-speed computer network. Moreover, the cost of constructing such multi-database system must be as low as possible, and in addition, the multi-database system must be able to change freely after being constructed, and must be flexible in terms of necessary maintenance.

Herein, the "multi-database system" is a general term for a system which widely realizes data sharing within a distributed system or in a network system. The environment constructed by the multi-database system will be called "multi-database environment."

However, when a database is shared and commonly used, the following problems arise in general:

1. Data included in different databases may have different meanings even if the data is represented by the same representation form;

2. Vice versa to the above-mentioned problem 1, data included in different databases may be represented by different styles even if the data have the same meaning;

3. Although establishing a conventional manner of combining data is possible among different databases, the representation forms with regard to combining attributes may nonetheless be different. Herein, the term "conventional manner of combining data" means combining processing realized by pattern matching that has been adopted by the conventional database system, and the combining attributes mean attributes of interest at the time of combining);

4. Databases subjected to integration may lack necessary data for the combining process; and 5. Even if different types of plural databases are combined, new data cannot be generated therefrom.

As a partial solution to the above-described problems 1 to 4, the following processes have conventionally been executed:

1) To transform or absorb the difference in meanings of the data, difference in the representation forms, difference in the combining attributes and the like, codes are incorporated in an application program; and 2) To compensate for lacking data, the lacking data is incorporated in the application program as data or as a constant value, alternatively a database which compensates for the lacking data is newly added.

However, as a result of the above solution, the following problems are further raised:

6. The aforementioned application program is generated independently each time a command related to sharing and common use of the database is sent; thus, responding to the command takes time;

7. When the aforementioned command related to sharing and common use of the database is changed, for most cases, it is difficult or impossible to reuse the aforementioned application program.

SUMMARY OF THE INVENTION

The present invention has been made in consideration of the above situation, and has as its object to provide an integrated database system capable of retrieving desired information from a plurality of different databases by combining necessary databases.

Another object of the present invention is to provide an integrated database system which can standardize a retrieving operation (retrieval) performed by users, regardless of difference or changes in structure of the database system.

According to the present invention, the foregoing object is attained by providing a data processing system capable of referring to plural types of databases, the data processing system including an upper-level system and a lower-level system, the upper-level system comprising: control data issue means for interpreting an inquiry represented by a first representation form addressed to one of the plural types of databases and issuing control data represented by a second representation form; and output means for receiving from the lower-level system a reply to the inquiry represented by the second representation form, transforming the reply into the first representation form, and outputting the transformed reply, and the lower-level system comprising: command output means for transforming the control data, which is represented by the second representation form and issued by the control data issue means, into a control command corresponding to the type of a database and outputting the transformed control command to at least one of the plural types of databases; and reply means for providing the upper-level system with a process result of the control command obtained from at least one of the plural types of databases, as a reply represented by the second representation form.

Furthermore, according to the present invention, the foregoing object is attained by providing a data processing method of a data processing system capable of referring to plural types of databases, the data processing system including an upper-level system and a lower-level system, comprising: a control-data issuing step of, in the upper-level, interpreting an inquiry represented by a first representation form addressed to one of the plural types of databases and issuing control data represented by a second representation form; a command outputting step of, in the lower-level, transforming the control data represented by the second representation form into a control command corresponding to the type of a database and outputting the transformed control command to at least one of the plural types of databases; a replying step of, in the lower-level system, providing the upper-level system with a process result of the control command obtained from at least one of the plural types of databases, as a reply represented by the second representation form; and an outputting step of, in the upper-level system, receiving from the lower-level system the reply to the inquiry represented by the second representation form, transforming the reply into the first representation form, and outputting the transformed reply.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a table showing contents of an inquiry;

FIG. 8 shows an example of script transformation;

FIGS. 9A and 9B are tables showing syntax of a script;

FIG. 10 shows an example of primitives generated by the script interpreter;

FIGS. 11 and 12 are tables showing an example of a hotel database;

FIG. 13 is a table showing an example of a geographical information database;

FIG. 14 is a table showing an example of the JR (Japan Railroad) time-table database;

FIGS. 15–18 are tables showing an example of an international flight time-table database; and FIG. 19 is a table showing an example outputted by the present system.

DETAILED DESCRIPTION OF THE PREFERRED EMBODIMENT

The preferred embodiment of the present invention will be described in detail in accordance with the accompanying drawings.

<Construction of System>

Figure 1:
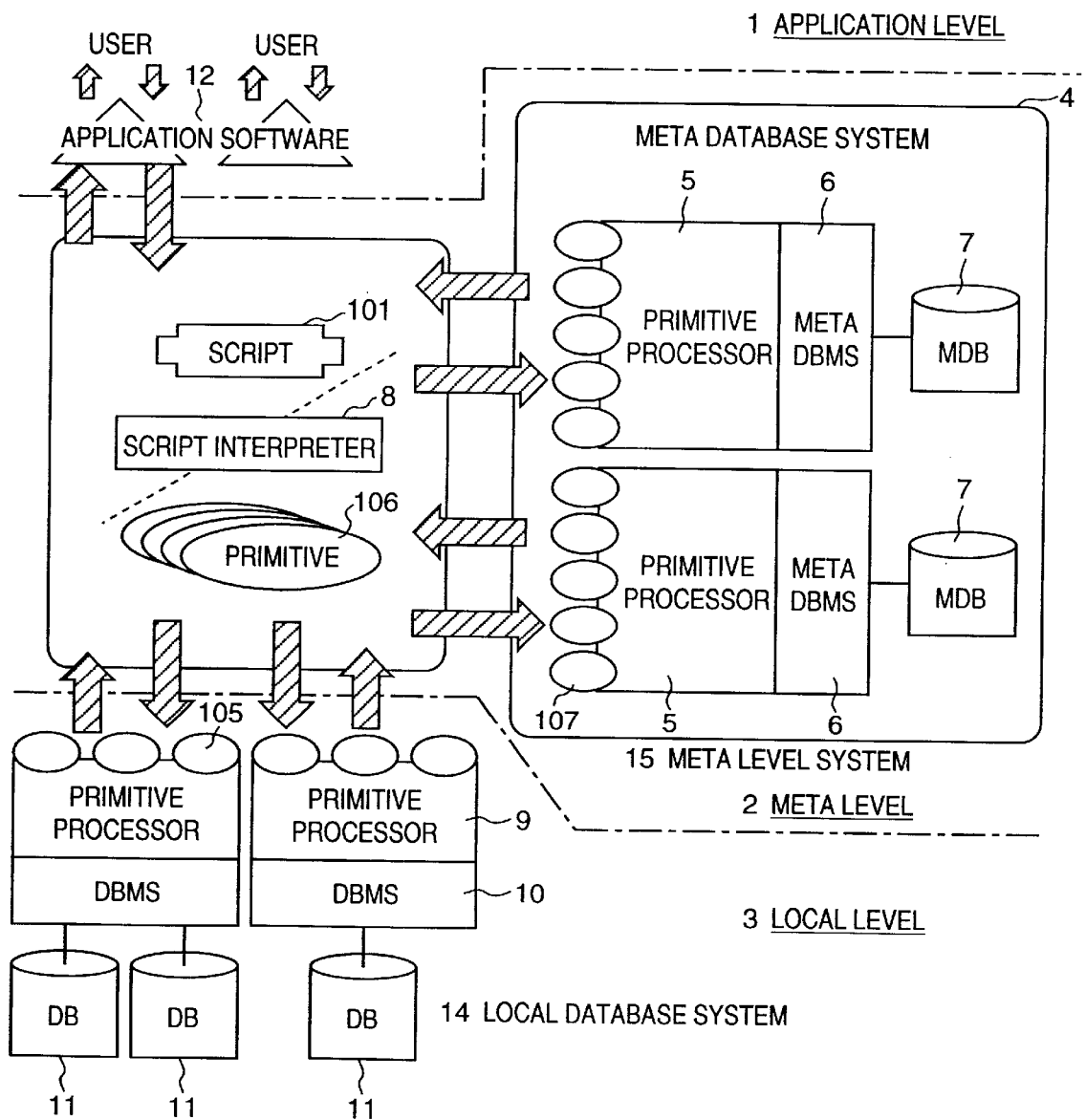
FIG. 1 is a diagram showing a construction of a database system according to an embodiment of the present invention.

FIG. 1 is a diagram showing a construction of a system integrating different types of databases (hereinafter referred to as "the present system") according to the present embodiment.

The present system is constituted by, roughly divided, three types of levels. They are, an application level 1, a local level 3, and a Meta level 2 existing as an intermediary in between the two.

The present system is from another viewpoint also divided into two levels: an upper level which includes the application level 1 and the Meta level 2, and a lower level which includes the local level 3.

<Application Level>

The application level 1 is a level directly associated with users of the present system. The application level 1, i.e., the application software 12, is provided to be used in the multi-database environment using the present system. A user makes an inquiry for information via the application software 12 and obtains a reply to the inquiry. The aforementioned application software 12 first describes or transforms the inquiry input by the user into a data form (hereinafter referred to as a "script form") which has been predeterminedly defined in the present system, issues the described or transformed inquiry to the Meta level 2, and obtains the reply to the inquiry. Hereinafter, the inquiry represented by the script form will be simply called a "script."

<Local Level>

The local level 3, connected to the multi-database environment adopting the present system, is a level including one or a plurality of databases 11 and database management system 10 (hereinafter generically referred to as a database system). Each database system individually handles tasks such as an inquiry, update, management and the like within the closed environment or closed system. In other words, the database system can be individually managed and operated also by conventional database techniques. The database system existing in the local level 3 is specifically called "local database system" 14. However, each database system generally has a database processing system unique to that database; thus, an identical operation procedure for all the databases is not guaranteed.

<Meta Level>

The Meta level 2, existing as an intermediary in-between the above-described application level 1 and the local level 3, is a system (hereinafter referred to as a "Meta level system" 15) comprising a script interpreter 8 and a Meta database system 4 which includes Meta database 7 and Meta database management system 6. In the Meta level system 15, an inquiry represented by a script 101 which has been received from the application level 1 is first interpreted by the script interpreter 8, and communication is established with the Meta database system 4 and local database system 14. More specifically, the script interpreter 8 transforms the inquiry into a form (hereinafter referred to as a "Meta primitive form") defined further by the present system, and sends the transformed inquiry to the Meta database system 4 and local database system 14 to obtain a reply. Hereinafter, an inquiry transformed into the Meta primitive form will be simply called a "primitive" 106).

<Connection Between Each Level>

(Connection Between Application Level and Meta Level)

Figure 2:
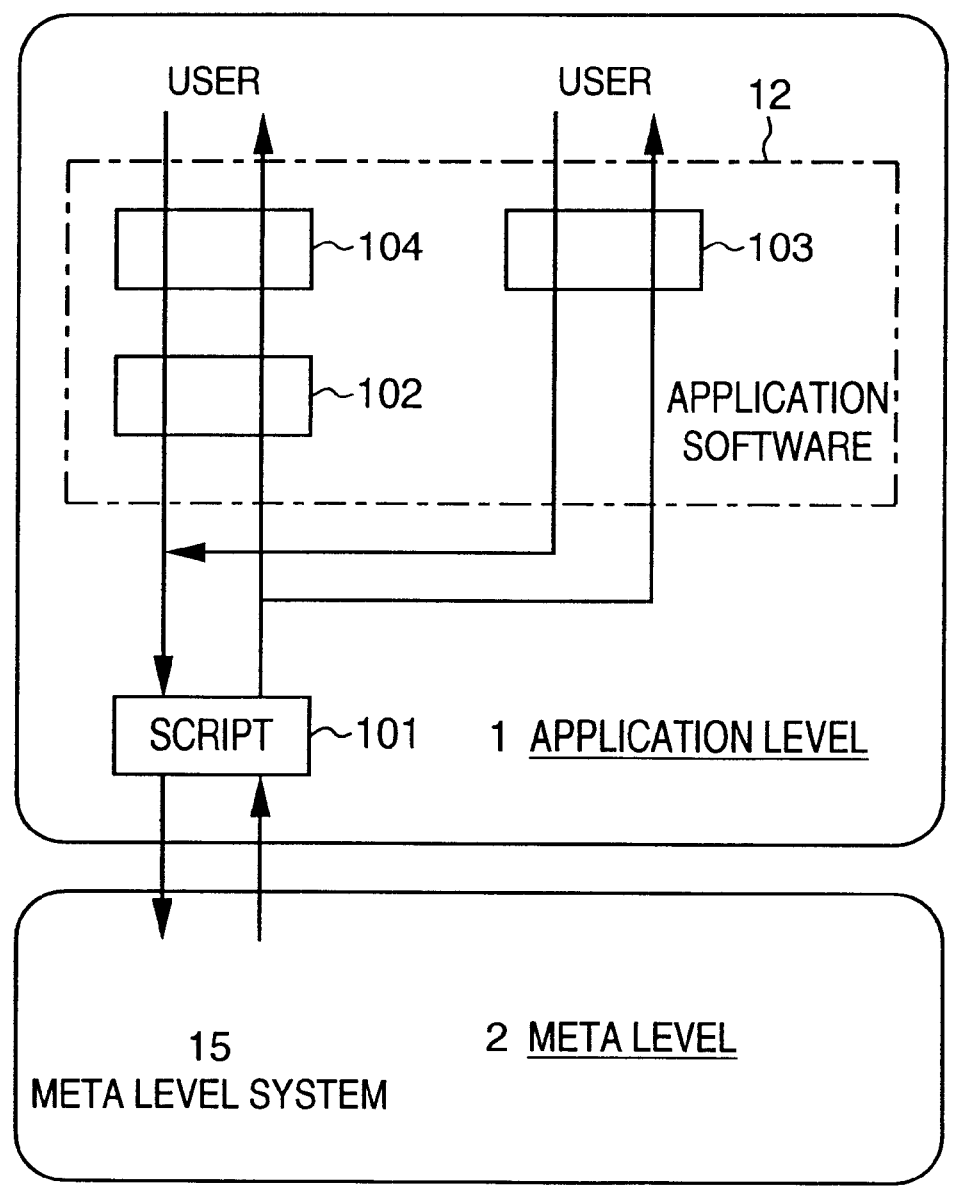
FIG. 2 is an explanatory view showing connection between an application level 1 and a Meta level 2.

FIG. 2 is an explanatory view showing the connection between the application level 1 and Meta level 2. The application level 1 and the Meta level 2 use the aforementioned script 101 as an interface. A user inputs an inquiry by operating the application software existing in the application level 1. The application software 12 transforms the inquiry into the script form using a script transformation unit 102, and issues the script 101, which is the inquiry written in the script form, to the Meta level system 15. The Meta level system 15 performs processing of the inquiry represented by each of the issued script and returns the reply in the script form to the application software 12.

As the above described application software 12, software 103 having a function of simply executing edit, issue and result-output of the script 101 may be used, or package software 104 provided for a personal computer or a work station comprising a graphical interface in addition to the aforementioned script transformation software 102 may be used.

(Connection Between Meta Level and Local Level)

The Meta level 2 and the local level 3 use the aforementioned primitive 106 as an interface. The primitive 106 interpreted from the script 101 by the script interpreter 8 is, when necessary, (1) issued to the Meta database system 4, interpreted and executed by a primitive processor 5 existing in the Meta database system 4; or (2) issued to the local database system 14, interpreted and executed by a primitive processor 9 existing in the local database system 14.

A primitive 107 in FIG. 1 denotes one of the primitives addressed to the primitive processor 5 in the Meta database system 4. Similarly, a primitive 105 denotes one of the primitives addressed to the primitive processor 9 in the local database system 14.

<Script Issuance and Primitive Execution>

Figure 3:
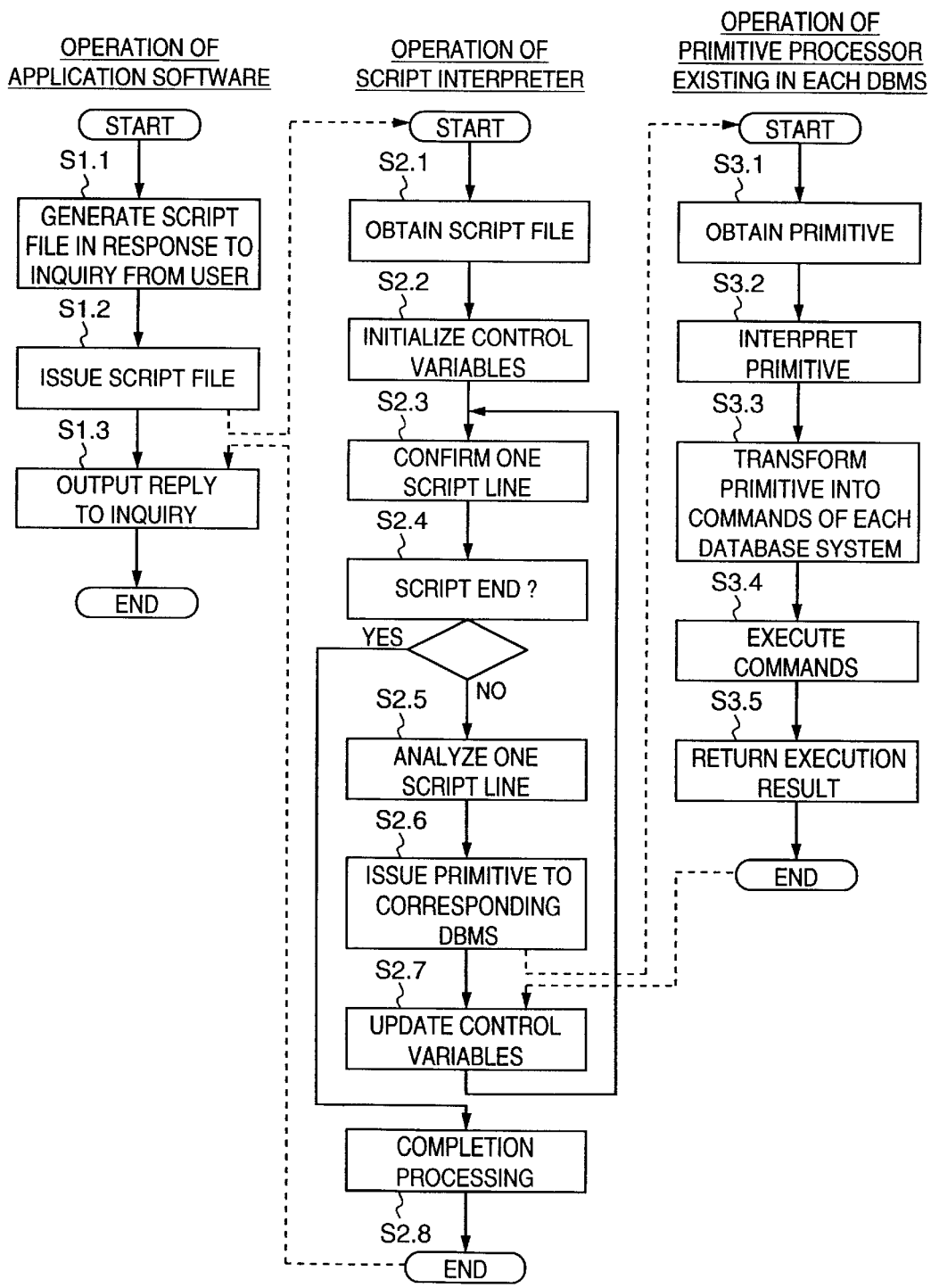
FIG. 3 is a flowchart showing operation of application software, a script interpreter and a primitive processor.

FIG. 3 is a flowchart showing the operation of the application software 12 in the application level 1, operation of the script interpreter 8 in the Meta level 2, and operation of the primitive processor 5 or 9 which has issued the primitive 106. The above three devices operate in association with one another as indicated by the broken lines in FIG. 3.

(Operation of Application Software)

In response to an inquiry from a user, a script is generated in step S1.1 in FIG. 3. Next, in step S1.2, the script 101 is issued to the Meta level 2 in a file form (hereinafter, a script in a file form will be called a "script file"). Contents of the script file are interpreted and executed by the script interpreter 8 existing in the Meta level in a unit of one line, and the result is returned to the application software 12 as the reply to the inquiry represented by the script file issued in step S1.2. In step S1.3, the reply to inquiry is outputted, and operation is completed.

FIGS. 9A and 9B show a description grammar (syntax) of a script.

(Operation of Script Interpreter)

In step S2.1, the script file 101 is obtained from the application software 12. At this stage, in order to sequentially interpret and execute the script, written in the script file, in a unit of a line, a group of control variables is initialized in step S2.2. In step S2.3, the current line of the script subjected to processing is confirmed. In step S2.4, it is determined whether or not the contents of the script line indicate an end of the script; and in a case where the contents indicate the end, completion processing shown in step S2.8 is performed and the script interpretation operation ends.

In a case where the contents of the script line do not indicate script completion, in step S2.5, one script line is analyzed. In the one-line analysis processing, the script line is transformed into a form of a primitive, and in step S2.6, the primitive is issued to the corresponding local database system 14 or the Meta database system 4. In step S2.7, processing for updating the group of variables is performed to advance the line subjected to script processing. Then, the processing returns to step S2.3.

Figure 5:
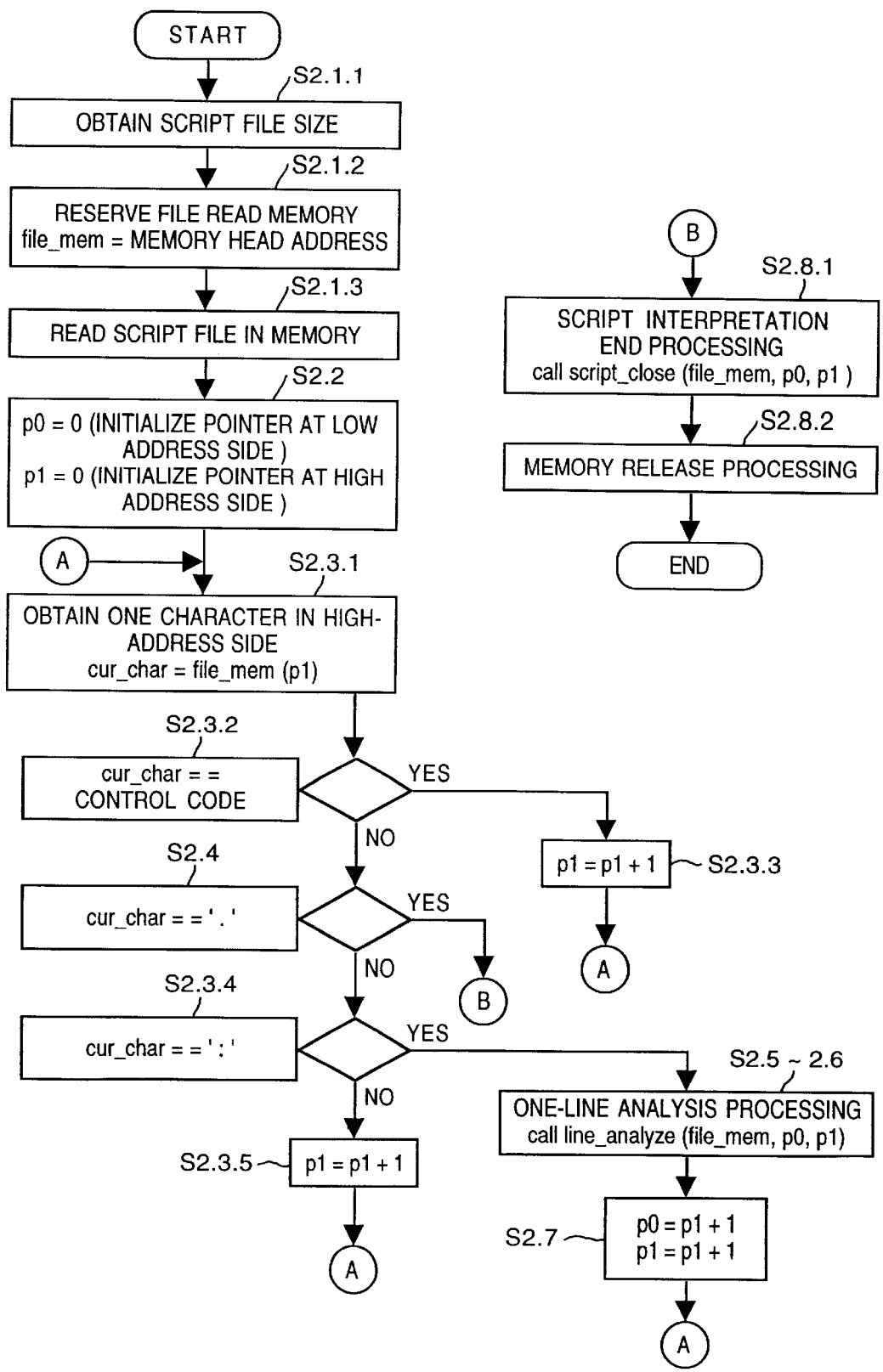
FIG. 5 is a flowchart describing operation of a script interpreter in detail.

FIG. 5 is a flowchart explaining the operation of the above-described script interpreter 8 in detail. Steps S2.1.1 to S2.1.3 (FIG. 5) correspond to the above-described step S2.1 (FIG. 3); steps S2.3.1 to S2.3.5 (FIG. 5) correspond to the above-described step S2.3 (FIG. 3); and steps S2.8.1 to S2.8.2 (FIG. 5) correspond to the above-described step S2.8 (FIG. 3). Control codes in step S2.3.2 indicate a character, e.g. a return code and the like, which do not affect the syntax of the script shown in FIGS. 9A and 9B. In step S2.3.3, such code is skipped. Note that in the flowchart shown in FIG. 5, explanation for the process where a comment line is ignored, is omitted.

Figure 6:
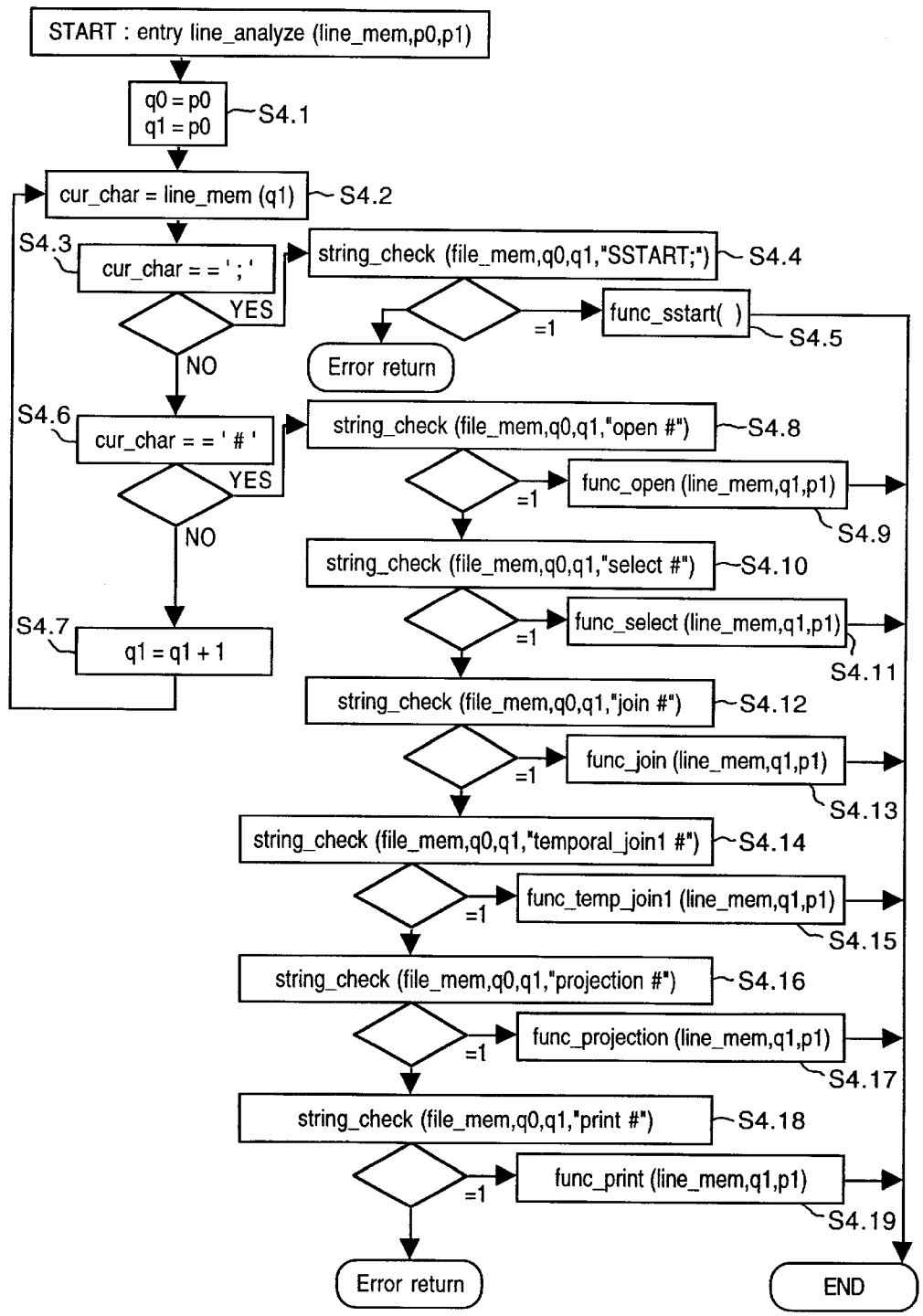
FIG. 6 is a flowchart explaining one-line analysis processing executed by the script interpreter in detail.

FIG. 6 is a flowchart explaining the one-line analysis processing executed in the above-described step S2.5 further in detail. As has been described above, in the one-line analysis processing, each line of the script is transferred in a unit of line from the contents of the script file read by the script interpretation apparatus. In "line_mem" included in START in FIG. 6, a top address of a memory which stores the script contents is inserted as a result of processing already performed in the previous steps of FIG. 5. Similarly, in "p0", a head memory pointer for the line to be processed is inserted, and in "p1", an end memory pointer for the line to be processed is inserted.

First, initialization is performed in step S4.1, and in steps S4.2, S4.3, S4.6 and S4.7, an operation portion in the script line is extracted. If the result of checking in step S4.3 is YES, a determination is made as to whether or not operation is SSTART and the controlling proceeds to the dealing process routine shown in step S4.5. The function "string_check( )" utilized in steps S4.4, S4.8, S4.10, S4.12, S4.14, S4.16 and S4.18 is a process of checking, by pattern matching, whether or not a character string, enclosed by " " and designated by the fourth argument, exists in the memory address designated as an argument and in a section delimited by the head memory pointer and end memory pointer. In a case of coincidence, return value 1 is returned, and in a case of non-coincidence, return value 0 is returned. If the result of the determination in step S4.6 is YES, an operation other than SSTART is recognized, and the processing proceeds respectively to the corresponding dealing process routines shown in steps S4.9, S4.11, S4.13, S4.15, S4.17 and S4.19.

FIG. 10 shows an example of primitives generated in the process routine corresponding to each operation of the above-described script line, and a method of determining an addressee. In the present system, a unit of processing represented by each of the lines in FIG. 10 is called a primitive. The primitive is classified into the following four types depending on a requested destination of the service (i.e., addressee of the primitive):

A group of primitives represented by the form of mmdb_XXX( ) (XXX herein denotes "arbitrary") is issued to the primitive processor 5 existing in the Meta database system 4. The Meta database system includes, as the Meta database, database-management information, having as database information, locations or management information of a plurality of databases which can be used by the present system, and a compensation-information database necessary to combine different types of databases. In other words, the Meta database system includes information necessary to access a plurality of local databases or to combine different types of databases.

A group of primitives represented by the form of ldb_XXX( ) is a primitive for a local database inquiry issued to the primitive processor 9 existing in the corresponding local database system 14 on the basis of information obtained from the Meta database system.

A group of primitives represented by a form of mm_XXX( ) executes combine processing and calculation processing unique to the present system, on the basis of the reply to the inquiry represented by the group of primitives ldb_XXX( ), obtained from a plurality of databases.

A group of primitives represented by the form of gen_XXX( ) is a primitive for widely-used functions necessary in general in the Meta level of the present system, other than those of the above-described primitives, for instance, including processing for securing an internal memory necessary to combine replies to an inquiry or tables.

"func_sstart" in step S4.5 in FIG. 6 issues mmdb_open( ) as a primitive corresponding to the script SSTART. The primitive is. issued to the primitive processor 5 to request opening of the database of local-database-management information existing in the Meta database 7, and a return value mmdb_sta is returned.

func_open( ) in step S4.9 issues three types of primitives as a primitive corresponding to the script m_open. In FIG.

10, the character strings enclosed in ⌈ ⌋ correspond to syntax of the script shown in FIGS. 9A and 9B. The character strings are extracted from a script line which has been transferred by an argument of each of the dealing process routine shown in steps S4.9, S4.11, S4.13, S4.15, S4.17 and S4.19, and transferred.

The primitive mmdb_service( ) transfers ⌈database name⌋ and ⌈table name⌋ designated by the script line to the primitive processor 5, and stores information related to a corresponding local database in a structure ldbinf (data storage memory where a plurality of information are structurally grouped). In the structure ldbinf, locations and management information of the corresponding database and information, such as a memory size and the like, necessary to develop tables are stored.

The primitive gen_memalloc( ) issues, to the primitive processor 5, an acquisition command of an internal memory necessary to develop a table obtained from the structure ldbinf. A return value mmsta is a top address of the reserved internal memory. In addition, the primitive ldb_open( ) issues an inquiry to the primitive processor 9 existing in the local database system which is the destination.

"func_select ( )" in step S4.11 in FIG. 6 issues a primitive ldb_select( ), which is a retrieve command, to the local database which has already been opened by the primitive ldb_open ( ). As arguments, the structure ldbinf, top address mmsta of the internal memory, and four arguments transferred from a script operator m-select: "retrieve object table name", "attribute name", "condition calculation operation" and "condition compare value", are set.

(Operation of Primitive Processor)

The primitive processor performs interpretation and execution of each primitive issued in step S2.6. The primitive processor 9 existing in the local database system 14 and the primitive processor 5 existing in the Meta database system 4 are provided. All database systems handled by the present system comprises a corresponding primitive processor. In general, since a plurality of database systems have different processing systems, a primitive processor corresponding to each of the systems transforms primitives into a command executable by the own database system. By the transformation, the difference in operation due to the different database systems is absorbed.

Steps S3.1 to S3.5 in FIG. 3, performed by each primitive processor, describe the process from receiving one primitive issued by the script interpreter to returning an execution result.

In step S3.1, a primitive is obtained. In step S3.2, the primitive is interpreted. In step S3.3, the primitive is transformed into a command for a database system which corresponds to the primitive processor. In step S3.4, the primitive processor issues the command to the corresponding database system. That is, the command is executed in the database system. In step S3.5, the result of the execution is returned to the script interpreter in the primitive form and then the operation ends. The result in the primitive form is transformed into the script form by the script interpreter.

<Meta Level System>

The Meta level system has the following roles.
1. The Meta level system absorbs differences in the data representation forms and difference in the attributes' definition among a plurality of local database systems.
2. The Meta level system provides a group of basic functions for combining local databases.
3. The Meta level system manages data which supports combining of local databases.

(Meta Form and Meta Data)

In order to realize the above-described role 1, the Meta level system provides a standard data representation form for the data included in the local database subjected to be combined. Herein, the standard data representation form will be referred to as "Meta form" and data represented by the Meta form will be referred to as "Meta data".

(Meta Database and Meta Database System)

In order to realize the above-described role 2, combine processing and calculation processing unique to the present system are executed by the group of primitives classified by the aforementioned mm_XXX( ).

Furthermore, in order to realize the above-described role 3, the Meta level system comprises a Meta database and a Meta database management system. For instance, the Meta database includes location information of local databases subjected to the operation. The Meta database also has a database for supplying data when an inquiry input by a user cannot be solved just by combining local databases. This is realized by the primitives classified by the aforementioned mmbd_XXX( ) and database management information included in the Meta database system.

<Example of System Construction>

Figure 4:
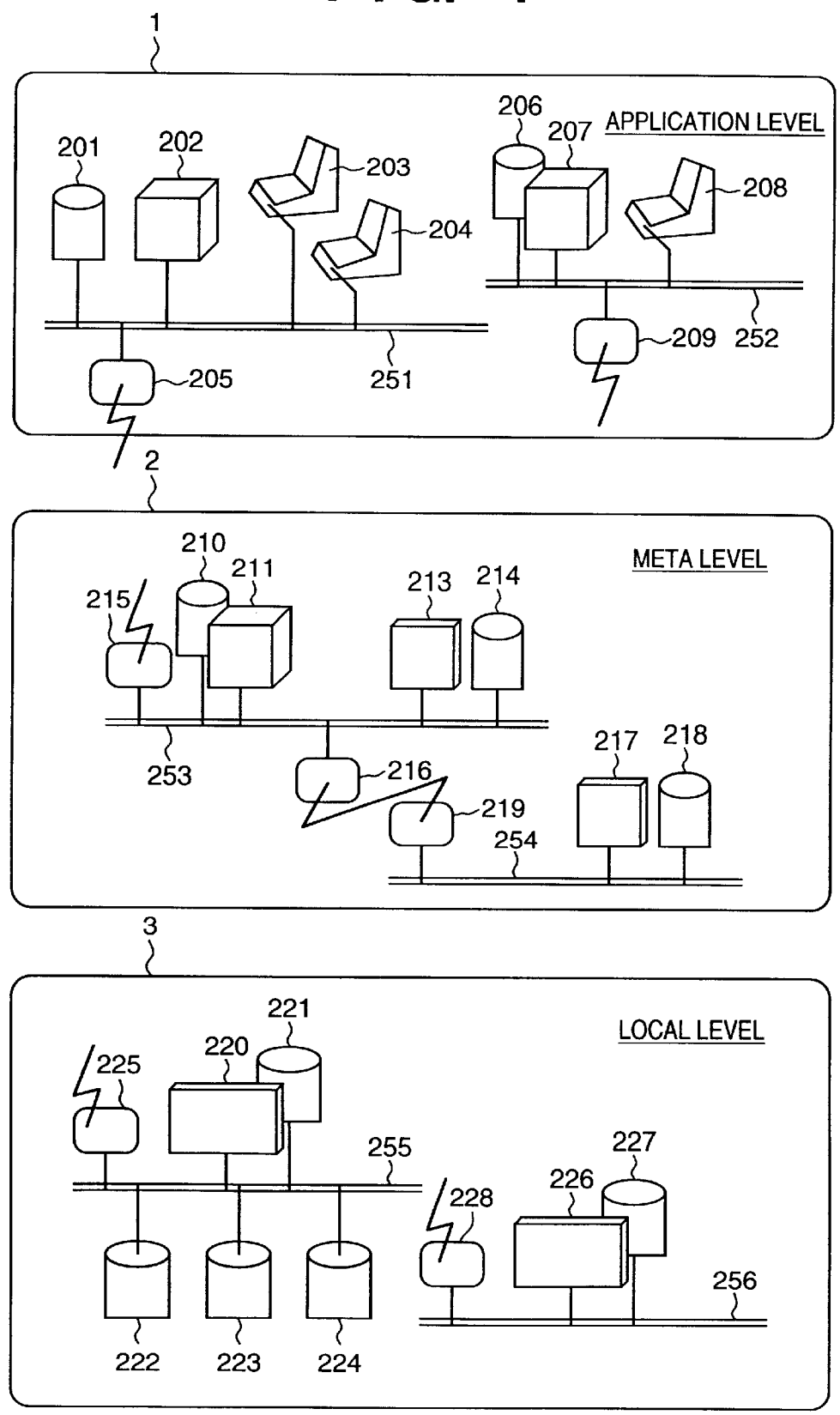
FIG. 4 is a system construction diagram of a database system as an embodiment of the present invention.

FIG. 4 is a diagram showing a system construction of the present system. Note that the construction of the present system is not limited to the one shown in FIG. 4, and a logically feasible construction other than that shown in this figure may be used.

(System Construction in Application Level)

In FIG. 4, each computer 202 and 207 comprises a central processing unit (hereinafter referred to as a CPU), an internal memory, a peripheral control device, an operating system and the like. The application software 12 and script transformation unit 102 are stored, as a program, in a disc serving as a memory medium of disc units 201 and 206, and are read out and executed by the computer 202 and 207 in response to a request inputted by a user from input/output terminals 203, 204 and 208.

(System Construction in Meta Level)

Referring to FIG. 4, a computer 211 has a similar configuration to that of computers 202 and 207, and serves as the script interpreter 8. Software for script interpretation processing is stored in a disc which is a memory medium of a disc unit 210, and is read out and executed by the computer 211 in response to an inquiry represented by the script 101 received from the application level.

A group of apparatuses 213, 214, 217 and 218 constitute the Meta database system 4. Computers 213 and 217 are for the Meta database 7 and Meta database management system 6. In FIG. 4, the Meta database exists as a physical file of disc units 214 and 218. In addition, the computer 213 serves as a database system which controls the Meta database 214, and as the corresponding primitive processor. Similarly, the computer 217 serves as a database system which controls the Meta database 218, and as the corresponding primitive processor.

Software for primitive processing is stored in a disc which is a memory medium of the disc units 214 and 218, and is read out and executed by the computers 213 and 217 in response to an inquiry represented by the primitive 107 received from the script interpreter.

(System Construction in Local Level)

In FIG. 4, the local database exists as a file of disc units 222, 223, 224 and 227, and a computer 220 serves as a local database system which controls the databases 222, 223 and 224, and as the corresponding primitive processor. Similarly, a computer 226 serves as a database system which controls the database 227, and as the corresponding primitive processor.

Software for primitive processing is stored in a disc which is a memory medium of the disc units 221 and 227, and is read out and executed by the computers 220 and 226 in response to an inquiry represented by the primitive 105 received from the script interpreter.

(Connection Between Each Level)

In FIG. 4, local area network 251–256 connects each of the apparatuses constituting the system in each level, and is connected with an external system via network connection apparatuses 205, 209, 215, 216, 219, 225 and 228. To connect the local area network with an external apparatus, for instance, a high-speed digital dedicated line or the like is used. For the connection between an external apparatus and the input/output terminal in the application level, dial-up operation or the like can be used via regular analog public lines. For instance, the connection can be realized in a structure where the line 252 is omitted, the input/output terminal 208 is directly connected with the computer 207, and the network connection apparatus 209 is substituted with a communication line adopter such as a modem device or the like which connects the computer 207 with public lines.

By the foregoing connecting method, it is possible to transfer and receive scripts between the application level and the Meta level, and to transfer and receive primitives between the primitive processors existing in the Meta database system in the Meta level, and the primitive processors existing in the local database system.

<Database Combining Processing by Present System>

Database combining processing executed by the present system will be described in detail utilizing the following example of an inquiry and reply.

(Example of Inquiry)

As a background of a user's inquiry made in the application level, an example is given as follows: "To leave Narita for New York on Sunday, I will stay at a hotel in Tokyo from the day before. The hotel in Tokyo is to be decided within my hotel budget. I would like to know the departure time of the train leaving Tokyo station for the Narita Airport Station, and the time for an airplane bound for New York."

It is assumed herein that the following information is to be obtained as the contents (item and data to be outputted) of an inquiry:

(1) Hotel: Name of a hotel which is geographically convenient to Tokyo Station, and whose room cost is within the budget;

(2) Train bound for Narita Airport station: Name of a train and departure time at Tokyo Station; and (3) Airplane bound for New York: Flight number and departure time for the airplane leaving on Sunday.

As a condition of the inquiry, for instance, "hotel located in Chiyoda-ku" is inputted for "geographically convenient to Tokyo Station," and "the rate for a single room is ¥10,000 or more and ¥19,000 or less" is inputted for the condition "within the budget". Further in this example, it is important to consider time necessary to transfer at the Narita airport. Therefore, it is necessary to add a condition such as "time difference between the arrival time of the train at the Narita Airport station and the departure time of the airplane from Narita Airport is more than 40 minutes and less than 2 hours." FIG. 7 shows the above-described contents in the organized manner.

(Issuance of Inquiry in Script form)

To make inquiry shown in FIG. 7, the application software generates scripts such as shown in FIG. 8, and issues the scripts in a file form to the Meta level system. Characters in-between the delimiter "/*" and "*/" are a comment which does not give any effects on actual processing or operation. For purposes of explanation, in FIG. 8, line numbers, assigned in increments of ten, are assigned to the lines that are not comments.

Each line of the scripts is delimited by the end of line symbol ";" and the end of script with the end of file symbol ".". The scripts are constructed with syntax in order to minimize the description in the application level, and the scripts are transformed into the corresponding primitives by the script interpreter 8.

In the present embodiment, the syntax in the above-described scripts is constructed with: (1) type of operation; (2) one or a plurality of argument related to operation object, operation and the like; (3) output object; and (4) end of file. The above (2) is distinguished by the delimiter "#", each argument is distinguished from what follows by the delimiter ",", and each end of file is distinguished by ";" or ".".

(Script Interpretation and Issuance of Primitive)

As described above, in the Meta level system, the scripts issued by the application level are interpreted in a unit of line by the script interpreter 8, transformed into primitives, and issued to the corresponding database. That is, in this example, primitives whose object of processing is hotel information, are issued to a hotel database. Similarly, primitives whose object of processing is information regarding a train bound for Narita Airport station, are issued to the JR (Japan Railroad) time-table database. Primitives whose object of processing is information regarding international flight information, are issued to an international flight time-table database. In the present example, the hotel database, JR time-table database and international flight time-table database are described as a relational-form database.

The table "hotel" in FIG. 11 shows the contents of the hotel database, the table "nex" in FIG. 14 shows the contents of the JR time-table database, and the tables "air" in FIGS. 15–18 show the contents of the international flight time-table database. To show the process of executing the scripts which make the inquiry described in the example, FIG. 12 shows the contents of the table "hotel" upon completion of the script line 050 (FIG. 8); FIG. 18 shows the contents of the table "air" upon completion of the script line 120 (FIG. 8); and FIG. 19 shows an output example from the present system after completion of all the scripts.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program. In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiment being realized by executing the program codes which are read by a computer, the present invention includes a case where an OS (Operating System) or the like working on the computer performs a part or all of the processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to each of the flowcharts described in the embodiment for each level or altogether.

As has been set forth above, the present invention is effective since it enables sharing and common use of a group of databases. Particularly, by virtue of the present invention, it is possible to make use of plural types of databases by combining different types of databases.

The present invention is not limited to the above embodiments and various changes and modifications can be made within the spirit and scope of the present invention. Therefore, to appraise the public of the scope of the present invention, the following claims are made.

What is claimed is:

1. A data processing system capable of referring to plural types of databases, said data processing system including an upper-level system and a lower-level system, the upper-level system comprising:

inquiry receiving means for receiving an inquiry from a user side represented by a script form, wherein the inquiry includes search requests for first and second kinds of data stored respectively in a first and second databases and a combination condition for a first attribute of the first kind of data and a second attribute of the second kind of data to combine the first and second kinds of data;

request issue means for interpreting the received inquiry and issuing the search requests represented as a set of primitives in a primitive form, to the lower-level system and issuing the combination condition to combine means, wherein the script form is a form of description in a declarative manner and the primitive form is a form of description in a procedural manner;

result receiving means for receiving from the lower-level system, the first and second kinds of data from the first and second databases as results of the search requests, the results being represented by the primitive form;

combine means for extracting a couple of respective items satisfying the combination condition for the first and second attributes from among the first and second kinds of data received by said result receiving means, and combining the extracted couple of items into a reply to the inquiry; and output means for transforming the combined reply of the primitive form into the script form, and outputting the transformed reply in the script form to the user side, and the lower-level system comprising:

command output means for interpreting the search requests, which is represented as a set of primitives in the primitive form one by one, into one or more control commands each in a form corresponding to the first and second database related to the control command and outputting the interpreted control commands to the first and second databases, respectively; and result transforming means for transforming process results of the control commands obtained from the first and second databases in the form corresponding to the respective types into the primitive form and providing the upper-level system with the transformed process results of the control commands, as the results of the search requests represented by the primitive form.

2. The data processing system according to claim 1, wherein the upper-level system includes management data storage means for storing management data for the database which can be an addressee of the control data issued by said control data issue means.

3. The data processing system according to claim 2, wherein said management data storage means includes:

a management-data database which stores management data;

management-command output means for transforming the control data represented by the second representation form issued by said control data issue means into a control command corresponding to said management-data database and outputting the transformed command thereto; and management-data output means for outputting, in the second representation form, the process result of the control command obtained from said management-data database.

4. The data processing system according to claim 1, wherein the upper-level system further includes compensation means for compensating the reply received from the lower-level system with compensation-data.

5. The data processing system according to claim 4, wherein said control data issue means further issues control data to said compensation means, and wherein said compensation means includes:

a compensation-data database which stores compensation data;

compensation-command output means for transforming the control data represented by the second representation form issued to said compensation means into a control command corresponding to said compensation-data database and outputting the transformed command; and compensation-data output means for outputting, in the second representation form, the process result of the control command obtained from said compensation-data database.

6. The data processing system according to claim 4, wherein said compensation means includes means for storing combine-compensation data used to combine process results obtained from different types of plural databases, and said output means includes combine means for combining, in the second representation form, process results obtained from different types of plural databases, by referring to the combine-compensation data.

7. The data processing system according to claim 1, wherein at least one of the plural types of databases is a relational-type database.

8. The data processing system according to claim 1, wherein the plural types of databases are included in the lower-level system.

9. The data processing system according to claim 1, wherein said data processing system further includes a user side system comprising:

inquiry issue means for issuing an inquiry represented by the first representation form to said control data issue means, in response to an inquiry represented by a user form from a user; and reply conversion means for converting the reply in the first representation form output from said output means into the user form.

10. A data processing method of a data processing system capable of referring to plural types of databases, said data processing system including an upper-level system and a lower-level system, comprising:

an inquiry receiving step of, in the upper-level, receiving an inquiry from a user side represented by a script form, wherein the inquiry includes search requests for first and second kinds of data stored respectively in a first and second databases and a combination condition for a first attribute of the first kind of data and a second attribute of the second kind of data to combine the first and second kinds of data;

a request issuing step of, in the upper-level, interpreting the received inquiry and issuing the search requests represented as a set of primitives in a primitive form, to the lower-level system, wherein the script form is a form of description in a declarative manner and the primitive form is a form of description in a procedural manner;

a command outputting step of, in the lower-level system, interpreting the search requests represented as a set of primitives in the primitive form one by one, into one or more control commands each in a form corresponding to the first and second database related to the control command, and outputting the interpreted control commands to the first and second databases, respectively;

a result transforming step of, in the lower-level system, transforming process results of the control commands obtained from the first and second databases in the form corresponding to the respective types into the primitive form and providing the upper-level system with the transformed process results of the control commands, as the results of the search requests to the inquiry, the results being represented by the primitive form;

a result receiving step of, in the upper-level system, receiving from the lower-level system, the first and second kinds of data from the first and second databases as results of the search requests, the results being represented by the primitive form;

a combining step of, in the upper-level system, extracting a couple of respective items satisfying the combination condition for the first and second attributes from among the first and second kinds of data received by said result receiving means, and combining the extracted couple of items into a reply to the inquiry; and an outputting step of, in the upper-level system, transforming the reply of the primitive form into the script form, and outputting the transformed reply in the script form to the user side.

11. The data processing method according to claim 10, wherein said outputting step includes a combining step of combining, in the second representation form, process results obtained from different types of plural databases.

12. The data processing method according to claim 10, wherein said command outputting step includes:

a management-command outputting step of transforming the control data represented by the second representation form into a control command corresponding to a management-data database, which stores management data for the database which is an addressee of the control data, and outputting the transformed command to the management-data database; and a management-data receiving step of receiving, in the second representation form, the process result of the control command obtained from the management-data database.

13. The data processing method according to claim 10, wherein in said control data issuing step further issues control data to a compensation-data database and said command outputting step includes:

a compensation-command outputting step of transforming the control data represented by the second representation form into a control command corresponding to the compensation-data database, which stores compensation data for the reply received from the lower-level system, and outputting the transformed command to the compensation-data database; and a compensation-data receiving step of receiving, in the second representation form, the process result of the control command obtained from the compensation-data database.

14. The data processing system according to claim 1, wherein the first and second attributes are temporal information and the combination condition is an allowable range of a difference between the first and second attributes.

15. The data processing method according to claim 11, wherein the first and second attributes are temporal information and the combination condition is an allowable range of a difference between the first and second attributes.

* * * * *